United States Patent [19]

Skendrovic

[11] 4,201,502
[45] May 6, 1980

[54] METHOD AND APPARATUS FOR TAP HOLE REAMING

[75] Inventor: Lawrence Skendrovic, West Mifflin, Pa.

[73] Assignee: William M. Bailey Company, Washington, Pa.

[21] Appl. No.: 957,662

[22] Filed: Nov. 3, 1978

[51] Int. Cl.² .......... B23B 35/00; B23B 51/06; B23B 27/10; B23B 41/02

[52] U.S. Cl. .......... 408/1 R; 408/56; 408/59; 408/60; 408/205

[58] Field of Search .......... 408/1 R, 56, 57, 59, 408/60, 61, 67, 68, 205, 207

[56] References Cited

U.S. PATENT DOCUMENTS

| Re. 15,928 | 10/1924 | Judy | 408/60 |
|---|---|---|---|
| 1,781,863 | 11/1930 | Shoemaker | 408/205 |
| 2,111,784 | 3/1938 | Johnson | 408/56 |
| 2,372,219 | 3/1945 | Miller | 408/59 |
| 3,461,750 | 8/1969 | Achelis et al. | 408/56 |
| 3,540,319 | 11/1970 | Greenberg | 408/1 |

*Primary Examiner*—Harrison L. Hinson
*Attorney, Agent, or Firm*—Carothers and Carothers

[57] ABSTRACT

A pouring ladle is mounted on a carriage which is movable along a track by a motor drive coupled thereto through an overrunning clutch. Movement of the carriage along the track is interrupted at a predetermined position to align the tap hole of the ladle with a rotating reaming tool. The reaming tool is axially advanced into the tap hole for reaming and then retracted and the carriage is released for continued movement along the track. The reaming tool is a hollow tubular body having a longitudinal relief slot penetrating the side thereof and an annularly shaped reaming head is concentrically and removably secured to the forward end of the body and air is fed forward under pressure into the rearward hollow end of the body for cooling and clearing of reamed cuttings.

12 Claims, 6 Drawing Figures

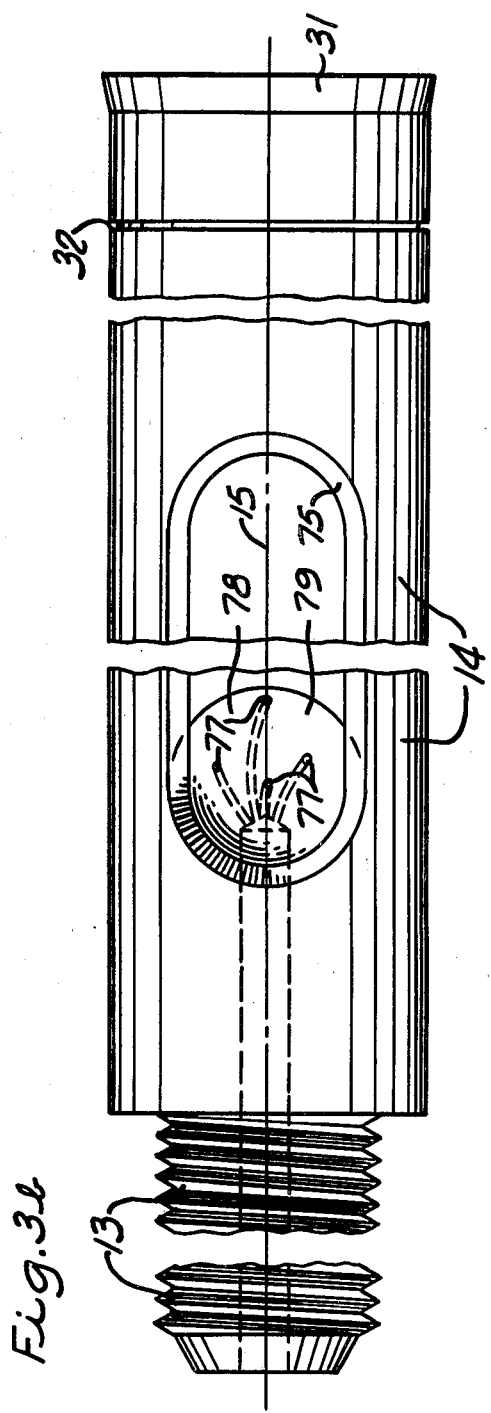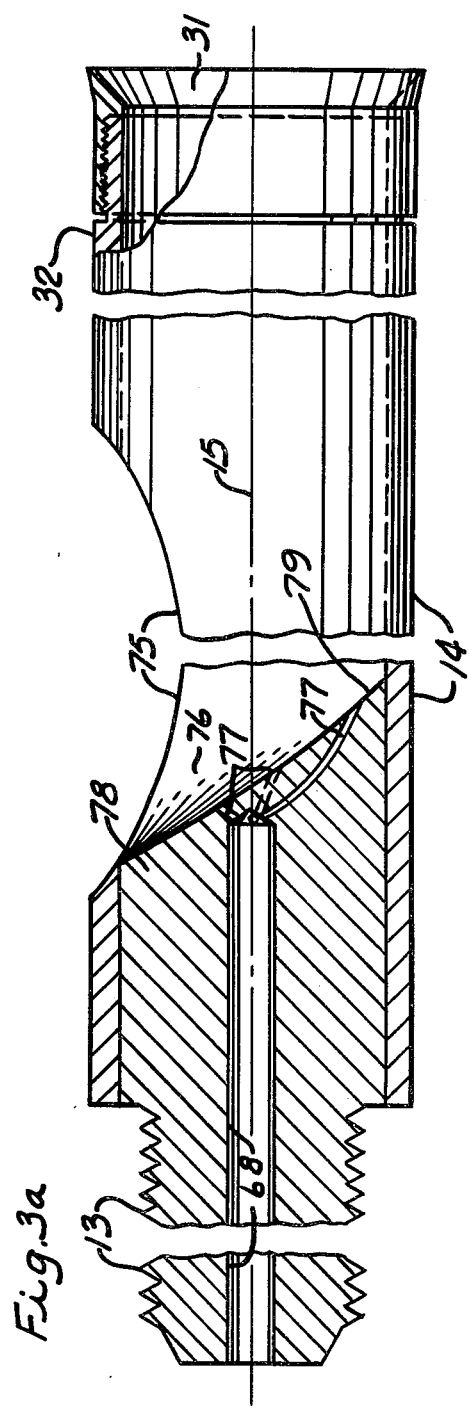

METHOD AND APPARATUS FOR TAP HOLE REAMING

BACKGROUND OF THE INVENTION

1. Field of the Invention

This invention relates generally to reamers and more particularly to tap hole reamers.

2. Discussion of the Prior Art

In foundries where iron castings are made, the molten iron was manually poured from a holding furnace into a series of molds. Such work was considered tedious, hot and dangerous. This problem was solved by the Central Foundry Division of General Motors Corporation, which developed an automatic pouring system manufactured and sold under license by Roberts Corporation of Lansing, Mich. under the trade name Roto-Pour.

This automatic pouring system is a carousel design where up to six pneumatic-powered ladles revolve continuously under a holding furnace where the hot liquid metal is poured into them. As the filled ladles revolve, the contents are poured continuously and in precisely measured amounts into molds mounted on small rail cars that pass under them. However, the tap holes for the ladles evenually become partially obstructed and they have to be manually cleaned out with a small jack hammer or the like, thus creating another tedious, hot and possibly dangerous job. In addition, clean out of the tap holes interrupts the continuous pouring operation, thereby slowing down production.

It is a principle object of the present invention to provide an automatic method and apparatus for reaming these ladle tap holes without interrupting continuous production.

SUMMARY OF THE INVENTION

The present invention provides a method and apparatus for vertically or horizontally reaming a ladle tap hole wherein the ladle is mounted on a carriage movable along a track and the carriage is moved along the track with a motor drive coupled thereto through overrunning clutch means. The movement of the carriage is interrupted along the track at a predetermined position with a stop means, and the ladle tap hole is thus axially aligned with a rotating reaming tool. The reaming tool is then axially advanced into the tap hole by the push of a button to ream the tap hole and then retract it. The stop means is then released to permit continued movement of the carriage along its track. The entire operation is done in a matter of seconds without interruption of the continuous pouring operation.

The tap hole reamer consists of a hollow tubular body having a longitudinal relief slot penetrating the side thereof and an annularly shaped reaming head concentrically and removably secured to the forward end of the body, and means are provided to feed air forward under pressure into the rearward hollow end of the tubular body.

In the preferred embodiment, the relief slot terminates between the ends of the hollow tubular reamer body, and the reaming head is ring shaped and annularly secured to the forward end of the body.

It is further preferable that the air fed under pressure through the hollow tubular body be blown through the tubular body in a swirling or spiral fashion so that the air tends to hold to the inside periphery or surfaces of the tubular body for more effective cooling and removal of debris through the aforesaid longitudinal slot.

This swirling effect of the air under pressure can be effected by providing a deflector which closes off the hollow rearward end of the tubular reamer body and a plurality of air passages penetrate the deflector for supplying air under pressure from an axial passage in the rearward end of the body to the interior of the body. To provide a spiraling effect to the blown air within the hollow body, these passage may spirally penetrate the deflector.

To further enhance the clearing and cooling effects of this blown air, the terminating surface of this deflector within the hollow rearward end of the reamer body is sloped relative to the axis of the body and is positioned to angle towards or face the side slot in the reamer body. This terminating surface may also be slightly concave to even further enhance these characteristics.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 3a is an enlarged view in side elevation and in partial section of one embodiment of the reamer tool of the present invention utilized with the tap hole reamer of FIGS. 1 and 2.

FIG. 3b is a plan view of the tap hole reaming tool shown in FIG. 3a.

DETAILED DESCRIPTION OF THE PREFERRED EMBODIMENTS

Figure 1:
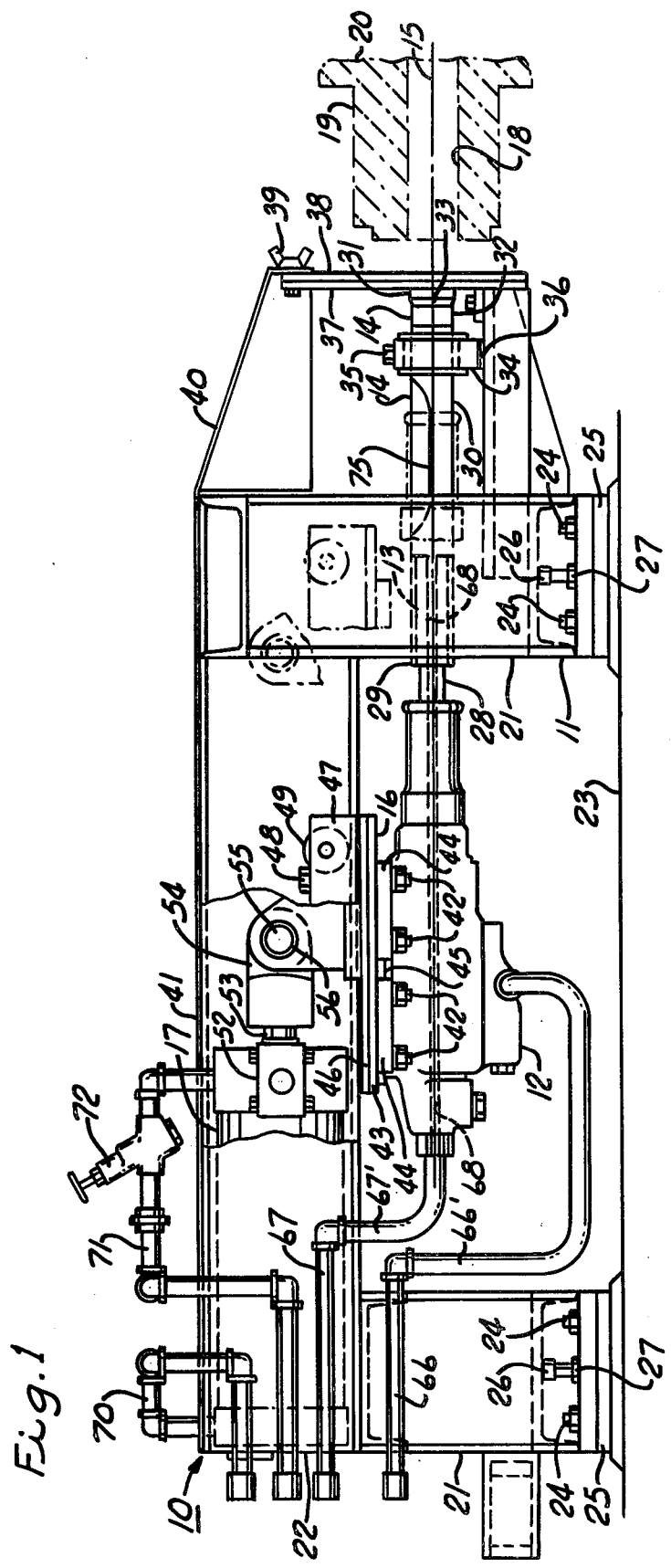
FIG. 1 is a view in side elevation of one embodiment of the tap hole reamer of the present invention with portions removed for internal viewing.
Figure 2:
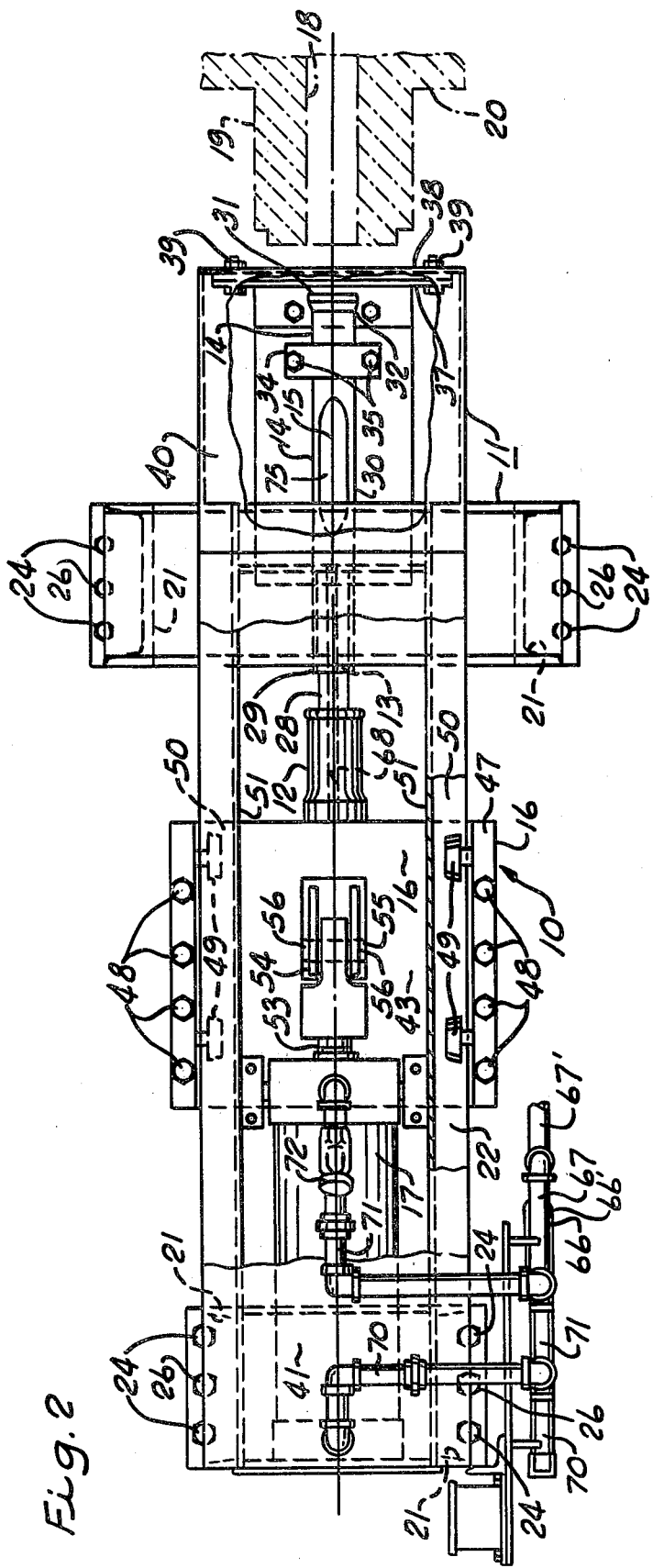
FIG. 2 is a plan view of the tap hole reamer shown in FIG. 1.

Referring to FIGS. 1 and 2, the reamer 10 of the present invention is comprised of a support frame 11 with a drifter drill motor 12 having the rearward end 13 of the elongated hole reamer 14 coupled thereto for reaming rotations on its longitudinal axis 15. Drifter motor 12 is mounted to carriage 16 which is movable along frame 11 by motor means or air cylinder 17 to advance and retract reamer 14 to ream tap hole 18 in the pouring spout 19 of foundry pouring ladle 20 as illustrated by the phantom outlines shown in FIG. 1.

Support frame 11 consists basically of four C-beam support legs 21 and transverse carriage frame 22 welded thereto. Support frame 11 is secured to the foundry floor 23 by means of foundation bolts 24. The support frame 11 is levelled and aligned by the use of levelling plates 25 and levelling bolts 26 together with their jam nuts 27 such that the axis 15 of reaming tool 14 will align and coincide with axis 15 of tap hole 18 when a pouring ladle 20 is stopped in front of tap hole reamer 10 for reaming.

Drifter drill motor 12 is a conventional pneumatic bore machine originally developed for deep hole and hard rock drilling such as the Model X-71 Drifter which is sold by William M. Bailey Company of Washington, Pa. Such drifters generally have the capability of drilling rotation or the combination of impacting with rotation and they have drilling rotations generally in the area of 140 r.p.m. Striker bar 28 of drifter 12 is provided with reamer tool coupling 29 secured to its forward end which threadably receives the rearward end 13 of reaming tool 14.

Tap hole reamer 14 consists of a cylindrical hollow tubular body 30 having an annular chisel point or reaming head 31 concentrically and removably secured to the forward end 32 of body 30 by means of threaded connection 33. Cylindrical body 30 is journalled in bearing block 34 for axial sliding and rotation. Bearing block 34 is in turn secured to support frame 11 by means of bolts 35 and shim packs 36 are provided therebetween to permit proper levelling and alignment of reamer body 30 with axis 15.

To shield the reamer from foundry heat and from the high temperatures emanating from the pouring ladles 20, a forward shield support 37 is mounted to the forward end of support frame 11, and supports the sheet of ceramic fiber insulation 38 which is held in position by means of wing nut and bolt combinations 39. The rest of the reamer is protected by heat shield covers 40 and 41, which cover the top of reamer 10 and are secured by similar bolt and wing nut combinations.

Drifter 12 is secured to carriage 16 by means of bolts and nuts 42. Carriage 16 consists of drifter mounting plate 43 to which drifter 12 is secured by means of the toe clamps 44 and bolts 42 which clamp the side lips 45 of drifter 12 to the underside of horizontal drifter mounting plate 43. Two side mounting plate shoes 46 in turn seat two side wheel mounting plates 47 which are secured to the carriage by means of bolts 48. Side wheel mounting plates 47 in turn carry trolley wheels 49 for rotation. Trolley wheels 49 ride on side tracks 50, which are the bottom webs or flanges of the side C-beams 51 of the transverse support frame section 22 to carry carriage 16 and drifter 12 back and forth in the axial direction of axis 15 along stationary support frame 11.

Carriage 16 is powered for movement along frame section 22 by means of motor or pneumatic cylinder 17 which is secured to frame 22 by trunnion top mounts 52. The piston rod 53 is secured to carriage 16 by means of cylinder clevis 54 and cylinder clevis pin 55 which is held in place by means of snap rings 56.

Figure 4:
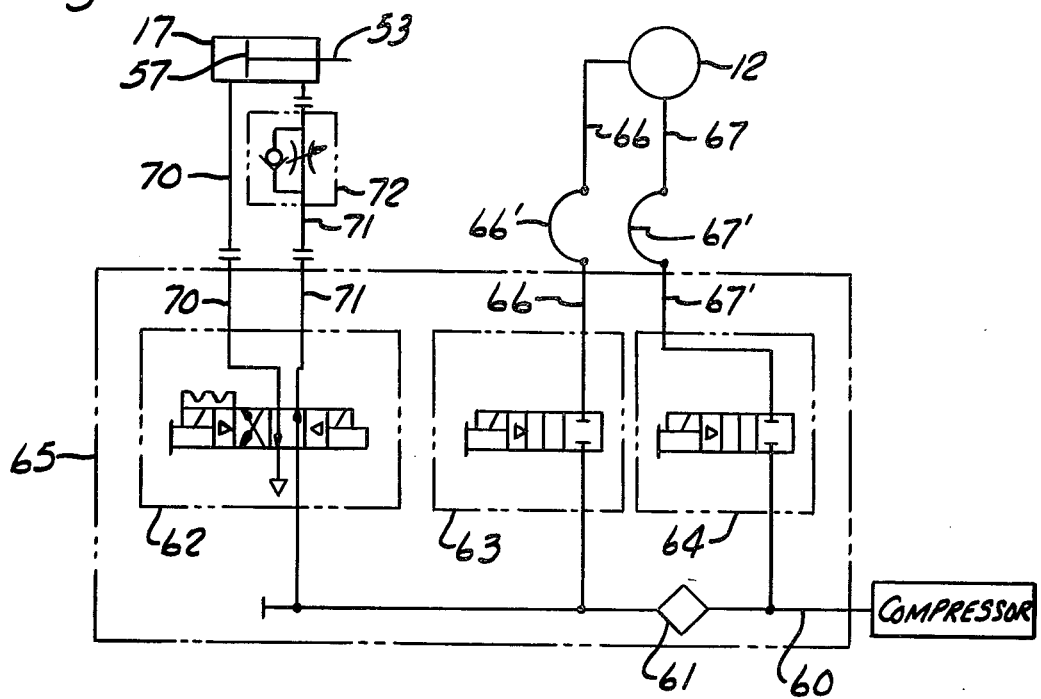
FIG. 4 is a pneumatic operating schematic diagram of the tap hole reamer shown in FIGS. 1 and 2.

Referring to FIGS. 1, 2 and 4, when cylinder 17 retracts piston 57 to the left, piston rod 53 also retracts, thereby retracting carriage 16, drifter 12, and reaming tool 14 with it. Of course, when piston 57 is advanced, the opposite occurs and reaming tool 14 is also advanced for reaming tap hole 18 of pouring ladle 20. Pneumatic cylinder 17 is shown in its retracted position in these Figures.

The air cylinder 17 and drifter 12 are pneumatically operated from a compressor which feeds air manifold pipe 60. Air manifold pipe 60 is lubricated with air line lubricator 61. The air manifold feeds drill cylinder valve 62, drill valve 63, and drill blow valve 64, which are electric solenoid operated valves. These valves and manifold 60 are housed within valve enclosure 65, which is a unit separate from tap hole reamer 10.

Drill valve 63 is indicated in its off position, and when actuated, supplies air via pipe 66 to drifter 12 to operate its pneumatic motor for reaming rotations of reaming tool 14. Pipe 66 is provided with a flexible connection 66' to allow for the travel of drifter along axis 15.

Drill blow valve 64 is also indicated in its closed position and when activated supplies air under pressure through pipe 67 to the rearward end of drifter 12. This pipe connection is also provided with an intermediate flexible hose 67' to allow for the back and forth travel of drifter 12 along axis 15.

Pipe 67 supplies air under pressure to air passage 68 which passes axially all the way through drifter 12 and striker bar 28 and continues on through the rearward end 13 of reaming tool 14 to supply air under pressure to the hollow interior of reaming tool 14 as will be explained in greater detail hereinafter in connection with FIGS. 3a and 3b.

Drill cylinder valve 62 (FIG. 4) supplies the air under pressure to pneumatic cylinder 17 for retracting and advancing the same, and in the Figure, valve 62 is illustrated in its retracted position as is piston 57 of cylinder 17. The output of valve 62 is connected to feed pipes 70 and 71, which supply cylinder 17.

As can be seen, this is a closed loop system for the air supply to cylinder 17, and feed pipe 71 is provided with cylinder speed control valve 72 which may be regulated to correspondingly regulate or vary the actuation speed of piston 57.

Referring to FIGS. 3a and 3b, the details of a preferred embodiment of the novel reaming tool 14 of the present invention are illustrated. In describing these Figures, reference should also be made to FIGS. 1 and 2.

The cylindrical hollow body 14 of the reaming tool is made of an alloy steel tubing to which the annular chisel point or reaming head 31 is attached by means of threaded connection 33. Instead of threaded connection 33, reaming head 31 may be secured to the forward end 32 of body 14 by any other conventional means such as by roll pins.

The hollow tubular body 14 is provided with longitudinal relief slot 75 which penetrates the side of the hollow body. Air is fed under pressure into the rearward hollow end 76 of body 14 via air blow passage 68, and the four air passages 77 which communicate therewith. Air passages 77 spirally penetrate deflector body 78 which closes off the hollow rearward end of hollow body 14. Deflector body 78 has a terminating surface 79 which is sloped relative to the axis 15 and generally faces the opening of slot 75. This surface 79 is also slightly concave.

The effect of deflector surface 79 together with the spiral shape of passages 77 provides a swirling action to the air exiting passages 77 into the hollow body 14 in a spiral fashion, which gets the air under pressure to the inner side walls of hollow body 14 and more or less holds the air to the periphery thereby efficiently cleaning reaming chips and debris from the interior of body 14 out through slot 75 and the forward opening also of body 14. This air also serves to efficiently cool the reamer body 14 and its reaming head 31 during the reaming operation.

Different cutting heads 31 may be substituted. For example, one may substitute a reaming head with a sawtooth configuration for the chisel point head 31.

Figure 5:
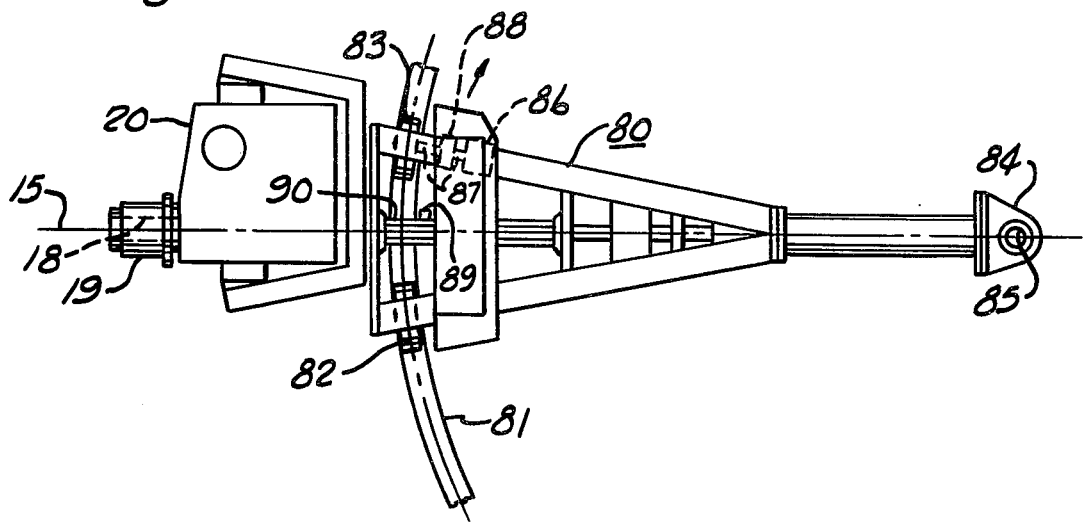
FIG. 5 is a diagrammatic plan view of one powered foundry pouring ladle of a plurality which make up a carousel type automatic pouring system.

Turning next to FIG. 5, with further reference back to FIGS. 1 and 2, FIG. 5 diagrammatically illustrates a top or plan view of one powered pouring ladle 20 mounted on carousel carriage 80 which is movable along annular track 81 by means of trolley wheels 82 and 83. Carriage 80 is in actuality an arm having its innermost end 84 pivotally connected to carousel center pin 85.

Carriage 80 is propelled along track 81 by means of a motor drive 86 which is in driving engagement to trolley wheel 83 via drive shaft 87 and overrunning clutch 88.

Drive wheel 83 therefore continually drives carriage 80 around annular track 81 unless a stop 89 is employed to engage the frame of carriage 80, thereby holding carriage 80 in position against the slippage of overrunning clutch 88 and thereby also axially aligning tap hole 18 of spout 19 with the rotating reaming tool 14. The reaming tool may then be axially advanced into tap hole 18 for reaming as depicted by the phantom outline in FIG. 1 and thereafter retracted from the tap hole. Then stop 89 is retracted to permit continued movement of carriage 80 together with its pouring ladle 20 along track 81, the entire operation taking a matter of seconds.

Stop 89 consists of nothing more than a vertical shaft or bar slidably received in a pneumatically operated holder in the foundry floor. When pneumatically operated, bar stop 89 projects vertically such that frame portion 90 of carriage 80 will engage stop 89 to hold the pouring ladle in exact alignment for reaming.

It should also be recognized that the tap hole reamer of the present invention may be used for vertical reaming operations as well as horizontal reaming operations, as illustrated.

I claim:

1. A tap hole reamer including a support frame with a drifter drill motor having the rearward end of an elongated hole reamer drivingly coupled thereto for reaming rotations on its longitudinal axis and said motor mounted to a carriage movable along said frame by air cylinder means to advance and retract said reamer, the improvement comprising, said hole reamer consisting of a hollow tubular body having a longitudinal relief slot penetrating the side thereof and an annularly shaped reaming head concentrically and removably secured to the forward end of said body, and means to feed air forward under pressure into the rearward hollow end of said body.

2. The tap hole reamer of claim 1 wherein said body is cylindrical and said relief slot terminates between the ends thereof, said reaming head being ring-shaped and annularly secured to the forward end of said body.

3. The tap hole reamer of claim 1 wherein said means to feed air under pressure includes means to direct the air under pressure forward within the hollow of said body with a swirling action.

4. The tap hole reamer of claim 3 wherein said means to direct the air under pressure includes a deflector closing off the hollow rearward end of said body and a plurality of air passages penetrating said deflector for supplying air under pressure from an axial passage in the rearward end of said body to the interior of said body.

5. The tap hole reamer of claim 4 wherein said passages spirally penetrate said deflector.

6. The tap hole reamer of claim 5 wherein said deflector has a terminating surface within the hollow rearward end of said body which is sloped relative to the axis of said body and faces said slot.

7. The tap hole reamer of claim 6 wherein said terminating surface is slightly concave.

8. The tap hole reamer of claim 1, 2, 3, 4, 5, 6 or 7, further characterized by a foundry pouring ladle having a pouring spout tap hole and mounted on a carriage movable along a track, a motor connected for driving said carriage along said track through overrunning clutch means, and stop means to temporarily stop said carriage with said tap hole axially aligned with said hole reamer for reaming said tap hole.

9. The tap hole reamer of claim 1 wherein said reaming head is ring-shaped with a forwardly extending chisel point.

10. A method of reaming a ladle tap hole comprising the steps of mounting a ladle on a carriage movable along a track, moving said carriage along said track with a motor drive coupled thereto through overrunning clutch means, interrupting the movement of said carriage along said track at a predetermined position with stop means and thereby axially aligning said tap hole with a rotating reaming tool, axially advancing said reaming tool into said tap hole and thereby reaming said tap hole, retracting said reaming tool from said tap hole, and releasing said stop means to permit continued movement of said carriage along said track.

11. The method of claim 10 wherein said reaming tool is a hollow tubular body having an open annular reaming cutting on the forward end thereof and a longitudinal slot relief penetrating the side thereof, and including the step of blowing air under pressure through said hollow tubular body during the step of advancing.

12. The method of claim 11 including the step of swirling the air in spiral fashion as it is blown through said tubular body.

* * * * *